United States Patent [19]

Fan et al.

[11] 4,027,308

[45] May 31, 1977

[54] METHOD AND APPARATUS FOR FORMING DROPLETS FROM A MAGNETIC LIQUID STREAM

[75] Inventors: George J. Fan, Ossining; Richard A. Toupin, Briarcliff Manor, both of N.Y.

[73] Assignee: International Business Machines Corporation, Armonk, N.Y.

[22] Filed: Dec. 28, 1973

[21] Appl. No.: 429,414

[52] U.S. Cl. .................................... 346/1; 346/75; 346/140 R

[51] Int. Cl.² .................................... G01D 15/18

[58] Field of Search ........................ 346/75, 140, 1; 239/102

[56] References Cited

UNITED STATES PATENTS

| | | | |
|---|---|---|---|
| 3,596,275 | 7/1971 | Sweet | 346/75 X |
| 3,698,002 | 10/1972 | Appel | 346/75 X |

OTHER PUBLICATIONS

Toupin et al.; Magnetohydrodynamic Velocity Modulation of a Jet; IBM Tech. Disc. Bulletin, vol. 15, No. 4, Sept. 1972, pp. 1189–1190.

Pimbley, W. T.; Synchronization of Magnetic Ink Jet Printer, IBM Tech. Disc. Bulletin, vol. 16, No. 3, Aug. 1973, pp. 948–949.

Chang et al.; Drop Stream Formation in Ferromagnetic Fluids, IBM Tech. Disc. Bulletin, vol. 16, No. 5, Oct. 1973, pp. 1683–1684.

*Primary Examiner*—Joseph W. Hartary

*Attorney, Agent, or Firm*—Frank C. Leach, Jr.

[57] ABSTRACT

One or more magnetic fields having non-uniform gradients is periodically applied to a magnetic liquid stream, which is preferably isotropic and virtually free of remanence, to create perturbations in the stream so as to form droplets therefrom with substantially uniform spacing and of substantially uniform size. If more than one of the magnetic fields is applied, the maximum strength of each field is spaced an integral multiple wave length from the maximum strength of the adjacent magnetic field with each magnetic field having substantially the same maximum strength. The wave length of the perturbation is preferably between $4d$ and $8d$ where $d$ is the diameter of the stream.

20 Claims, 4 Drawing Figures

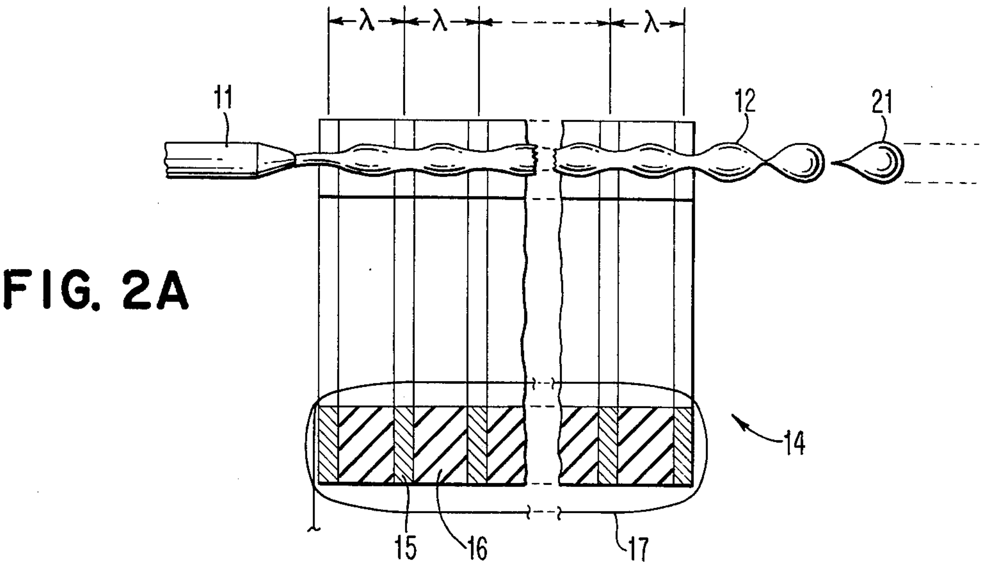
FIG. 2A
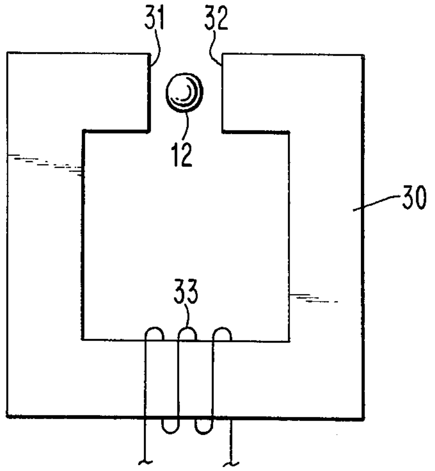
FIG. 2B
FIG. 3
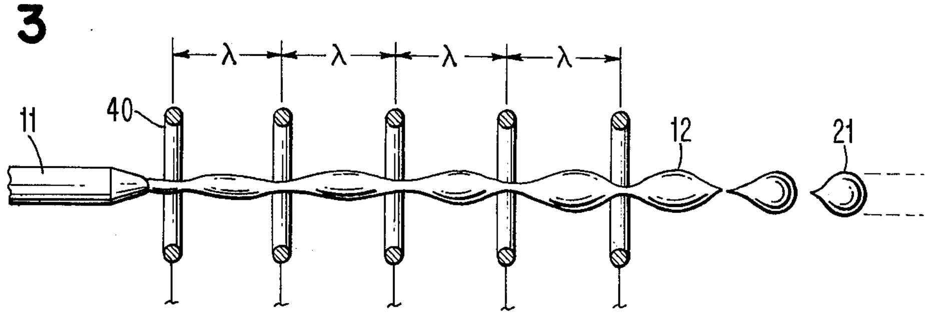

METHOD AND APPARATUS FOR FORMING DROPLETS FROM A MAGNETIC LIQUID STREAM

In ink jet printing, a stream of ink is supplied under pressure and periodically interrupted to produce droplets, which impinge upon a suitable recording surface such as a sheet of moving paper, for example. To obtain printing on the paper by the ink, it is necessary that the droplets be spaced substantially uniform distances from each other, be of substantially uniform size, and be formed at a high rate such as about $10^5$ per second, for example.

It is necessary for the droplets to have substantially uniform spacing so that each droplet can be directed to the recording surface or deflected prior to reaching the recordingsurface in accordance with the pattern to be printed. If the droplets are too close, then they may not be deflected away from the recording surface so that an erroneous print pattern on the recording surface will be produced.

Various means for obtaining synchronization of the droplets have been previously suggested. For example, mechanical forces have been applied to a nozzle by a piezoelectric device at a desired frequency.

When using a mechanical arrangement for creating the break-up of the stream into droplets, the mechanical force applied to one nozzle to produce a vibration frequency of the nozzle can have an effect on an adjacent nozzle of the ink jet stream if the ink streams are disposed on 10 mil centers, for example. The transmission of the mechanical vibrations to an adjacent nozzle can prevent the production of the droplets from the stream of the adjacent nozzle from having substantially uniform spacing therebetween and being of substantially uniform size.

Another problem with the mechanical arrangement for creating the break-up of the stream into droplets is that a structure such as the piezoelectric device, for example, which is attached to the nozzle, has its own resonant frequencies. Furthermore, each of the piezoelectric devices, for example, have slightly different resonant frequencies. Thus, it is difficult to obtain the desired vibrations of the nozzle when using the mechanical arrangement.

Furthermore, if the velocity of the stream is changed, then a new design is required for the nozzle. Thus, the mechanical arrangement is limited to one specific velocity of the jet stream.

Another suggested means of creating perturbations in the ink jet stream has utilized a magnetohydromagnetic force on the stream to create formation of the droplets. This type of structure is shown and described on pages 1189 and 1190 of the September 1972 (volume 15, No. 4) issue of the IBM Technical Disclosure Bulletin.

One problem with this structure is that a split supply tube must be added at the end of the nozzle with one portion being conductive and the other being non-conductive. This structure is rather difficult to manufacture.

The present invention satisfactorily solves the foregoing problems by producing the droplets at substantially uniform spacing and of substantially uniform size without the attachment of any structure to the nozzle while still obtaining modulation of the velocity of the jet stream exiting from the nozzle. Thus, the difficulties inherent in attaching a structure to the nozzle to create vibrations to change the velocity of the jet stream are eliminated with the method and apparatus of the present invention.

Furthermore, with the method and apparatus of the present invention, there is no requirement for any new design when the velocity of the jet stream is changed. With the method and apparatus of the present invention, the frequency imposed on the jet stream is readily altered when desired.

When using the method and apparatus of the present invention, the nozzles for each of a plurality of ink streams, if more than one ink stream is required, can be placed very close to each other without the droplet forming means for one of the ink streams having any effect on any of the adjacent ink streams. Thus, formation of droplets from each ink stream, if more than one ink stream is required, can be effectively controlled with the method and apparatus of the present invention.

With the present invention, it is not necessary to have any split type of supply tube attached to the nozzle as when using the magnetohydrodynamic arrangement. Thus, the manufacturing problem of the magnetohydrodynamic arrangement is avoided by the present invention.

The present invention accomplishes the foregoing through periodically applying a magnetic field of non-uniform gradient to the ink stream along its axial direction prior to the time that the stream would randomly break-up into droplets. The random break-up of the stream into droplets depends upon its surface tension, its velocity, and its diameter with the break-up occurring after the stream leaves a confined passage.

By controlling the maximum strength of the magnetic field applied to the jet stream, the force density produced by the field on the magnetic ink stream produces a perturbation therein. The frequency of the perturbation is controlled by the frequency with which the magnetic field is applied to the stream.

The force density on the stream is proportional to the magnitude of the non-uniform gradient of the magnetic field or flux density and is in the direction in which the gradient is applied. Thus, the force, which results from the force density, on the magnetic ink stream is always in the direction of the increasing magnitude of the gradient of the flux density. Therefore, by controlling the manner in which the magnetic field is applied to the magnetic liquid stream, the force can be applied along the axis of the stream or parallel thereto.

In the preferred embodiment, the present invention contemplates using one or a plurality of electromagnets, for example, to produce a magnetic field having a non-uniform gradient or a plurality of magnetic fields having non-uniform gradients with each of the fields having substantially the same maximum strength. If more than one electromagnet is used, the electromagnets are preferably disposed from each other an integral wave length of the perturbation produced in the stream.

The velocity of the stream is equal to the product of the wave length of the perturbation and the frequency with which the perturbation is applied. Thus, by disposing electromagnets at an integral wave length of the perturbation, the maximum force and momentum on the stream occur at the location of each of the electromagnets.

Furthermore, the perturbation has a wave length greater than the circumference of the stream and preferably less than eight times the diameter of the stream.

With the wave length of the perturbation in this range, the perturbations tend to grow at a sufficient rate to produce formation of droplets at substantially uniform spacing and of substantially uniform size.

An object of this invention is to form droplets at substantially uniform spacing and of substantially uniform size from a magnetic liquid stream.

Another object of this invention is to electromagnetically modulate a magnetic liquid stream to produce droplets with substantially uniform spacing therebetween and of a substantially uniform size.

A further object of this invention is to form droplets at substantially uniform spacing and of substantially uniform size from a magnetic liquid stream in accordance with the velocity of the stream.

The foregoing and other objects, features, and advantages of the invention will be apparent from the following more particular description of preferred embodiments of the invention as illustrated in the accompanying drawings.

In the drawings:

FIG. 2A is a sectional view of the exciter of FIG. 1 and taken along line 2A—2A of FIG. 1.

FIG. 2B is an end elevational view of another embodiment of the exciter of the present invention.

FIG. 3 is a schematic sectional view, partly in side elevation, of a further modification of the exciter of the present invention.

Figure 1:
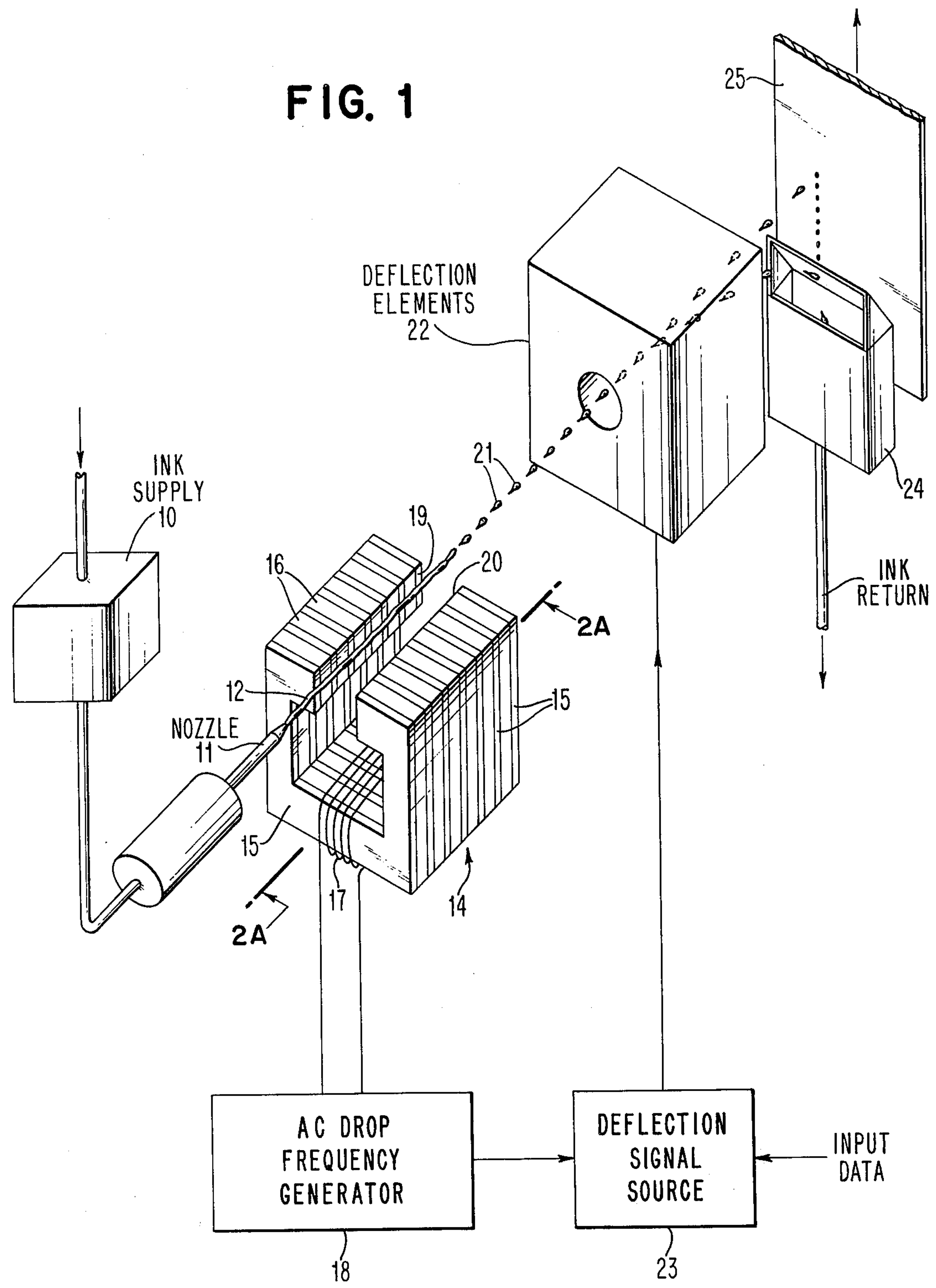
FIG. 1 is a schematic perspective view showing an ink recording arrangement having one form of an exciter of the present invention for creating perturbations in a magnetic liquid stream to cause synchronous formation of droplets therefrom with the droplets producing printing on a recording surface.

Referring to the drawings and particularly to FIG. 1, there is shown an ink supply 10 of magnetic ink. The magnetic ink may be any suitable magnetic ink, which is preferably isotropic and virtually free of remanence. One suitable example of the magnetic ink is a ferrofluid ink of the type described in our copending U.S. patent application for "Recording System Utilizing Magnetic Deflection," Ser. No. 284,822, filed Aug. 30, 1972, now U.S. Pat. No. 3,805,272 and assigned to the same assignee as the assignee of this application. Another example of the magnetic ink is a stable colloidal suspension in water of 100 A size particles of magnetite ($Fe_3O_4$) with surfactant surrounding the particles.

The ink supply 10 supplies magnetic ink to a nozzle 11 under pressure such as 50 p.s.i., for example, from which the ink issues as a stream 12 through an opening at the end of the nozzle 11. An exciter 14 is disposed in axial alignment with the path of the stream 12 as it exits from the nozzle 11. The exciter 14 comprises a plurality of C-shaped magnets 15 with a C-shaped spacer 16 of non-magnetic material disposed between each adjacent pair of the C-shaped magnets 15.

A coil 17 is wrapped around the exciter 14 and has a plurality of turns wrapped around all of the magnets 15 and the spacers 16. The coil 17 has its ends connected to an AC drop frequency generator 18 to receive a periodic current therefrom so that all of the C-shaped magnets 15 produce their magnetic fields with non-uniform gradients at the same time and from the same current.

Each of the C-shaped magnets 15 has its pole faces 19 and 20 spaced substantially the same distance from the axis or center of the stream 12. The length of each of the pole faces 19 and 20 of each of the C-shaped magnets 15 in the direction of the stream 12 is less than the distance between droplets 21, which are to be found by the exciter 14 from the stream 12. The length of each of the pole faces 19 and 20, which are substantially parallel to the axis of the stream 12, of each of the magnets 15 is preferably about one half of the wave length of the perturbations produced in the stream 12 by the exciter 14 and is about three times the diameter of the stream 12.

The gap between the pole faces 19 and 20 of each of the magnets 15 must not be too wide. Otherwise, the magnetic field produced by current flowing through the coil 17 would become too flat to act on the stream 12 in the desired manner to produce the desired perturbations in the stream 12. This is due to the density of the magnetic fielld decreasing as the gap between the pole faces 19 and 20 increases. Similarly, the intensity of the magnetic field also decreases as the gap between the pole faces 19 and 20 of each of the magnets 15 increases. Thus, the distance across the gap between the pole faces 19 and 20 of each of the magnets 15 is about four times the diameter of the stream. The length of the pole faces 19 and 20 of each of the magnets 15 and the gap therebetween are the critical parameters for producing a desired perturbation of the stream 12 as it passes therebetween.

The distance between the top of the pole face 19 or 20 of each of the magnets 15 and the bottom thereof must be greater than about four times the diameter of the stream 12. This is not a critical parameter as long as it exceeds the gap between the pole faces 19 and 20.

The spacing of the distance between the magnets 15 in the direction of the stream 12 must be a wave length of the perturbation produced in the stream 12 or a multiple thereof. Thus, the distance between the centers of the adjacent magnets 15 of the exciter 14 are an integral wave length of the perturbation produced in the stream 12 by the exciter 14.

Each of the magnets 15 is formed of a high permeable material to reduce the current required to flow through the coil 17 to produce the desired magnetic field. Thus, the magnets 15 could be formed of ferrite, which is a ceramic material, or mu metal, for example.

As previously mentioned, the spacers 16 are formed of a non-magnetic material, which must have a thermal expansion near the thermal expansion of the magnetic material of the magnets 15. Suitable examples of the non-magnetic material for the spacers 16 are brass, copper, and plastic.

It should be understood that the magnets 15 of the exciter 14 might be formed in such a manner that air could be utilized as the non-magnetic material between the magnets 15. Thus, it is not a requirement that the magnets 15 have a material therebetween as long as a low permeability exists between the adjacent magnets 15.

The AC drop frequency generator 18 produces a time periodic current output. The current may have a square wave or a sine wave, for example, over each time period. The generator 18 produces the current of the desired shape through producing the necessary voltage.

After the droplets 21 are formed, they pass through deflection elements 22, which are connected to a deflection signal source 23. The deflection elements 22 may be of the type shown and described in our aforesaid patent application, for example. The deflection signal source 23 applies a signal to the deflection elements 22 to determine whether each of the droplets 21 falls into a gutter or chute 24 from which the droplet 21 is returned to the reservoir of the ink supply 10 or strikes a recording surface such as a moving paper 25.

The position on the paper 25 at which each of the droplets 21 strikes the paper 25 also can be determined by the strength of the signal to the deflection elements 22 from the deflection signal source 23. Of course, if a plurality of the ink streams 12 were used, then the deflection elements 22 would either cause the droplet 21 to fall into the gutter 24 or strike the same position on the paper 25 each time as indicated in FIG. 1.

It should be understood that the AC drop frequency generator 18 and the deflection signal source 23 must be synchronized so that the deflection signal source 23 provides the desired deflection to the droplet 21 when it is within the deflection elements 22. Thus, it is necessary that the droplets 21 have substantially uniform spacing so that only one of the droplets 21 is within the deflection elements 22 at any time and that the time of arrival of the droplet 21 within the deflection elements 22 is in accordance with the substantially uniform spacing between the droplets 21.

The C-shaped magnet 15, which is closest to the nozzle 11, is placed as close to the opening of the nozzle 11 as it is physically possible for most efficient results. Of course, it is only necessary that the C-shaped magnet 15, which is closest to the opening of the nozzle 11, create perturbations in the stream 12 before random break-up thereof would occur.

By using a plurality of the magnets 15 to form the exciter 14, the variations in the velocity of the stream 12 may be avoided. These variations, which are known as velocity chatter, can cause errors in printing on the desired pattern paper 25 through the droplet 21 arriving too early or too late at the paper 25.

Each of the C-shaped magnets 15 produces a varying flux density between the substantially parallel pole faces 19 and 20. Since the force density is directly proportional to the gradient of flux density, the location of the gradient of the maximum flux density also is the location of the maximum force density.

The maximum axial gradient of the flux density on the stream 12 from one of the magnets 15 occurs at the edges of the pole faces 19 and 20 passed first by the stream 12 moving along its path. The minimum axial gradient of flux density occurs at the edges of the pole faces 19 and 20 of the magnets 15 passed last by the stream 12. Accordingly, prior to a particle of the stream 12 entering the gap between the pole faces 19 and 20 of the magnet 15, the particle is subjected to an increasing force density from the axial gradient of flux density of the pole faces so as to accelerate the particle. Similarly, as the particle leaves the magnet 15, it is subjected to a deceleration to tend to keep the particle within the magnetic field.

Thus, by spacing the centers of the C-shaped magnets 15 a wave length of the perturbation from each other, the maximum force density on the stream 12 from each of the magnets 15 occurs on the same point of the stream 12 through correlating the velocity of the stream 12 with the wave length of the perturbation so that a particular particle of the stream 12 will move from one of the maximum force density positions produced by one of the magnets 15 to the next maximum force density position produced by the next adjacent magnet 15 when the next of the non-uniform axial gradients of the magnetic fields is applied to the stream 12 by the magnets 15. Therefore, it is desirable to have the distance between the centers of the adjacent magnets 15 equal to the product of the velocity of the stream 12 and the time period from the application of one magnetic field to the application of the next magnetic field.

Accordingly, the application of the maximum axial gradient of the flux density to the same particle of the stream 12 by each of the magnets 15 as the stream 12 is advanced past the magnets 15 substantially prevents variations in the velocity of the stream 12. Thus, velocity chatter of the stream 12 is substantially eliminated.

Referring to FIG. 2B, there is shown another form of the invention in which a single C-shaped magnet 30 is used as the exciter to form the droplets 21 from the stream 12. The C-shaped magnet 30 has the same dimensional relations between its pole faces 31 and 32 as each of the magnets 15.

The C-shaped magnet 30 has a single coil 33 with a plurality of turns wrapped around the magnet 30. The coil 33 would be connected to the generator 18 to create a magnetic field with a non-uniform gradient in the axial direction on the jet stream 12 when it is passing between the pole faces 31 and 32 of the magnet 30. Thus, the magnet 30, which would be located as close as possible to the opening of the nozzle 11 for most efficient results, creates a perturbation in the stream 12 on a segment each time that a magnetic field is applied to the stream 12 from the magnet 30 due to the current passing through the coil 33. This perturbation continues along the stream within the segment as the segment moves away from the magnet 30.

Thus, while the magnets 15 of the exciter 14 of FIGS. 1 and 2A create additional forces on the segment of the stream 12 as the segment advances along the path of the stream 12, the magnet 30 of FIG. 2B is effective only on each segment of the stream 12 as it is subjected to the magnetic field of the magnet 30. After it is demagnetized, each segment grows by itself. The demagnetization of the segment occurs when the current through the coil 33 from the generator 18 is stopped.

The magnet 30 is readily usable with any velocity of the stream 12 that is reasonable with respect to the pressure of the stream 12 and the wave length of the perturbation. When the magnets 15 forming the exciter 14 are employed, there can be no change in the wave length of the perturbations because of the spacing between the magnets 15. Thus, if the velocity of the stream 12 changes, the frequency of the pertubations must be changed through charging the frequency with which the current is applied from the generator 18 to the coil 17 of the exciter 14 or else the spacing between the magnets 15 must be altered. Accordingly, if the frequency of the perturbations cannot be changed for some reason and the velocity of the stream 12 is altered, then it would be necessary to change the spacing between the magnets 15.

It is desired that the material of the stream 12 be selected so that it is magnetically saturated when the fields of non-uniform gradients from the magnets 15 of the exciter 14 or the magnetic field of non-uniform gradient from the magnet 30 is applied to the stream 12. When the magnets 15 are spaced at an integral wave length of the perturbations from each other, the entire stream 12 from the magnet 15 closest to the outlet of the nozzle 11 to the point of break-up of the stream 12 into the droplets 21 is magnetically saturated when the stream 12 is magnetically saturated by the field.

Referring to FIG. 3, there is shown another form of the present invention in which a plurality of coils 40, which could be formed of copper, for example, is positioned to create perturbations in the stream 12 when a current is supplied periodically to the coils 40 from the AC drop frequency generator 18. The centers of the coils are spaced from each other an integral of the wave length of the perturbation in the same manner as the magnets 15. The coils 40 are connected in series to each other so that the magnetic fields having the non-uniform gradients are produced by all of the coils 40 at the same time.

Since each of the magnets 15 produces a greater field strength than produced by each of the coils 40, the magnets 15 are preferred. The field from the coils 40 has a different geometry than that produced by the magnets 15. The field of each of the coils 40 is cylindrically symmetrical with respect to the stream 12.

While the magnetic liquid stream 12 is preferably isotropic so that the directions of magnitization and flux density coincide at each point of the stream 12, it should be understood that such is not a requisite for droplets to be formed from the stream 12. Likewise, while the stream 12 is preferably virtually free of remanence, it should be understood that such is not a requisite for the stream 12 to have the droplets 21 formed therefrom.

With the pole faces 19 and 20 of the magnet 15 or the pole faces 31 and 32 of the magnet 30 substantially parallel to the axis of the stream 12, the force density, which is produced by the gradient of the magnetic flux density of the magnet 15 or 30, at the axis of the stream 12 is along the axis of the stream 12. Moving outwardly from the axis or center of the stream 12 results in any point in the stream 12 not being substantially the same distance from each of the pole faces 19 and 20 or 31 and 32 but slightly closer to one pole face than the other. As a result, the force density is not completely parallel to the axis of the stream 12 at other than the axis because of the particles on the stream 12 not being equal distant from both of the pole faces of the magnet 15 or 30. However, this is only a slight variation because of the relatively small diameter of the stream 12.

While the magnets 15 are preferably spaced a wave length from each other for simplification insofar as ascertaining the desired relation between the maximum of the force density and the velocity of the stream 12, it should be understood that such is not a requisite. As previously mentioned, it is only necessary that the magnets 15 have their centers an integral multiple of the wave length of the perturbation.

While the present invention has described the application of a magnetic field having a non-uniform gradient or magnetic fields having non-uniform gradients as being sufficient to magnetically saturate the stream 12, it should be understood that such is not required. It is only necessary that there be sufficient magnetization of the stream 12 to produce the desired perturbation thereof.

An advantage of this invention is that it may be used at any frequency. Another advantage of this invention is that it permits the obtaining of a substantially maximum number of droplets from a jet stream. A further advantage of this invention is that there is no mechanical vibration of the nozzle. Still another advantage of this invention is that it has no effect on any adjacent stream.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method of forming droplets at substantially uniform spacing of substantially uniform size from a pressurized magnetic liquid stream including:

periodically applying a magnetic field having a non-uniform gradient to at least one segment of the stream at a predetermined position in the path of the stream prior to the position in the path of the stream at which the stream would randomly break-up after exiting from an opening or the like during its flow;

and selecting the maximum strength of the magnetic field to produce a perturbation in the stream having a wave length within the range at which the perturbation will grow.

2. The method according to claim 1 in which the strength of the magnetic field is sufficient to magnetically saturate the stream.

3. The method according to claim 1 including:

periodically applying a plurality of magnetic fields of substantially the same maximum strength simultaneously to spaced segments of the stream with each of the fields having a non-uniform gradient;

and disposing the maximum strength of each of the magnetic fields the same distance from each other in the axial direction of the stream with the distance being an integral wave length of the perturbation.

4. The method according to claim 3 in which the strengths of the magnetic fields are sufficient to magnetically saturate the stream.

5. The method according to claim 1 in which:

the stream has a diameter of *d*;

and the wave length of the perturbation is between 4*d* and 8*d*.

6. The method according to claim 1 in which the non-uniform gradient is in the axial direction of the stream.

7. An apparatus for forming droplets at substantially uniform spacing of substantially uniform size from a pressurized magnetic liquid stream including;

means to supply the pressurized magnetic liquid stream along an axis from an opening or the like;

and means to periodically apply a magnetic field having a non-uniform gradient to at least a segment of the stream after it exits from the opening and before the stream would randomly break-up to produce a perturbation therein having a wave length within the range at which the perturbation will grow.

8. The apparatus according to claim 7 in which said applying means applies a magnetic field having a strength sufficient to magnetically saturate the stream.

9. The apparatus according to claim 8 in which said applying means includes:

a C-shaped magnet having a pair of pole faces disposed substantially the same distance from the axis of the stream and on opposite sides thereof;

each of the pole faces of said magnet being the same length and having a length through which the stream travels of less than the distance between the droplets to be formed;

a coil wrapped around a portion of said magnet;

and means to periodically apply a current to said coil to cause the magnetic field to be periodically applied to the stream.

10. The apparatus according to claim 8 in which said applying means includes:

a circular coil having its center aligned with the axis of the stream;

and means to periodically apply a current to said coil to cause the magnetic field to be periodically applied to the stream.

11. The apparatus according to claim 7 in which said applying means includes a plurality of means to apply a separate magnetic field of substantially the same maximum strength at each of a plurality of locations along the stream during its flow with the locations of each of the maximum strengths being spaced the same distance from each other in the axial direction of the stream and the distance being an integral wave length of the perturbation, each of the magnetic fields having a non-uniform gradient.

12. The apparatus according to claim 11 in which said applying means applies a magnetic field having a strength sufficient to magnetically saturate the stream.

13. The apparatus according to claim 11 in which each of said applying means includes:

a C-shaped magnet having a pair of pole faces disposed substantially the same distance from the axis of the stream and on opposite sides thereof;

a single coil wrapped around each of said magnets;

and means to periodically apply a current to said coil to cause the separate magnetic fields to be periodically applied to the stream.

14. The apparatus according to claim 11 in which:

each of said applying means includes:

a circular coil having its center aligned with the axis of the stream;

said coils being series connected to each other;

and means to periodically apply a current to said series connected coils to cause the separate magnetic fields to be periodically applied to the stream.

15. The apparatus according to claim 11 in which:

the stream has a diameter of *d;* and the wave length of the perturbation is between 4*d* and 8*d*.

16. The apparatus according to claim 11 in which each of said applying means applies the non-uniform gradient in the axial direction of the stream.

17. The apparatus according to claim 7 in which said applying means includes:

a C-shaped magnet having a pair of pole faces disposed substantially the same distance from the axis of the stream and on opposite sides thereof;

a coil wrapped around a portion of said magnet;

and means to periodically apply a current to said coil to cause the magnetic field to be periodically applied to the stream.

18. The apparatus according to claim 7 in which said applying means includes;

a circular coil having its center aligned with the axis of the stream;

and means to periodically apply a current to said coil to cause the magnetic field to be periodically applied to the stream.

19. The apparatus according to claim 7 in which:

the stream has a diameter of *d:* and the wave length of the perturbation is between 4*d* and 8*d*.

20. The apparatus according to claim 7 in which said applying means applies the non-uniform gradient in the axial direction of the stream.

* * * * *